(12) United States Patent
Liu

(10) Patent No.: US 12,349,656 B1
(45) Date of Patent: Jul. 8, 2025

(54) PET TOY

(71) Applicant: Shenzhen LEPLE Technology Co., Ltd., Guangdong (CN)

(72) Inventor: Zhiping Liu, Guangdong (CN)

(73) Assignee: Shenzhen LEPLE Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/912,097

(22) Filed: Oct. 10, 2024

(30) Foreign Application Priority Data

Sep. 10, 2024 (CN) .......................... 202411263855.3

(51) Int. Cl.
*A01K 15/02* (2006.01)
(52) U.S. Cl.
CPC .................................. *A01K 15/025* (2013.01)
(58) Field of Classification Search
CPC .... A01K 15/025; A01K 15/026; A01K 15/02; A01K 15/024; A01K 15/027; A01K 29/00; A63F 9/0601
USPC ................. 119/707, 702; D30/160
See application file for complete search history.

(56) References Cited

U.S. PATENT DOCUMENTS

| | | | | |
|---|---|---|---|---|
| 4,803,953 A | * | 2/1989 | Graves | A01K 15/025 124/16 |
| 6,209,491 B1 | * | 4/2001 | Olson | A01K 15/025 119/702 |
| 10,869,461 B1 | * | 12/2020 | Kreischer | A01K 15/025 |
| 2002/0166513 A1 | * | 11/2002 | Van Sluis | A01K 15/025 119/702 |

* cited by examiner

*Primary Examiner* — Peter M Poon
*Assistant Examiner* — Carly W. Lynch
(74) *Attorney, Agent, or Firm* — JEEN IP LAW, LLC

(57) ABSTRACT

A pet toy include a housing, a self-moving device, and a flexible rope. The housing defines an internal space. Observation holes communicated with the internal space are defined in the housing. The internal space is observed through the observation holes, so the internal space defines a visible areas and a hidden area. The self-moving device is placed inside the internal space. When the self-moving device moves within the internal space, the self-moving device moves back and forth between the visible area and the hidden area. A first end of the flexible rope is connected to the self-moving device. When the self-moving device moves within the internal space, the self-moving device drives the flexible rope to move, so that a second end of the flexible rope is allowed to extend out from and retract into any one of the observation holes.

4 Claims, 4 Drawing Sheets

PET TOY

TECHNICAL FIELD

This application relates to the field of pet products, specifically to a pet toy.

BACKGROUND OF THE PRESENT INVENTION

As living standards continue to rise, pet ownership has become a modern trend. With pet ownership comes the need for play, resulting in a wide variety of pet toys available on the market.

However, most existing pet toys are designed to be visible and do not effectively cater to pets' natural curiosity or significantly enhance their play interest.

SUMMARY OF PRESENT INVENTION

The objective of this application is to provide a pet toy that engages pets' curiosity, encouraging them to play and increasing their interest in play.

To achieve this goal, the application provides a pet toy that includes at least a housing and a self-moving device. The housing forms an internal space, and has observation holes on its outer surface. The observation holes communicate with the internal space. The internal space is observed through the observation holes, so the internal space defines a visible areas and a hidden area. The self-moving device is placed inside the internal space and, when it moves, the self-moving device moves back and forth between the visible area and the hidden area.

The pet toy further includes a flexible rope, and a first end thereof is connected to the self-moving device. As the self-moving device moves within the internal space, it drives the flexible rope, causing s second end of the flexible rope to extend and retract through any one of the observation holes.

The self-moving device moves within the internal space by rotating.

The housing has a top surface, a bottom surface, and two side surfaces, which together form the internal space.

The two side surfaces respectively extend upward from a first end and a second end of the bottom surface. The top surface is connected with a third end and a fourth end of the bottom surface. The first end of the bottom surface is opposite to the second end of the bottom surface. The third end of the bottom surface is opposite to the fourth end of the bottom surface. The top surface is curved, and the top surface is connected with the two side surfaces.

The observation holes are respectively defined on the top surface and the two side surfaces.

The housing is made from a lightweight material, so that when the self-moving device and/or the flexible rope impacts at least part of the side surfaces and/or the top surface, the housing is made to shake.

At least one end of the bottom surface is angled upward.

A diameter of at least one of the observation holes is greater than a size of the self-moving device, allowing the self-moving device to be installed into the internal space through the at least one of the observation holes.

The housing includes a supporting frame and a flexible cover. The supporting frame is positioned inside the flexible cover to form the internal space therein, and the observation holes are made in the flexible cover.

The provided technology places the self-moving device inside the housing and creates observation holes in the housing. As the self-moving device moves, it may appear in the visible area through the observation hole or enter the hidden area. This creates a playful effect where the device appears and hides, enticing the pet to play with it. This setup maximizes the pet's engagement and interest in play.

Additionally, a flexible rope is attached to the self-moving device. The rope moves along with the device, creating an effect where it occasionally extends through the observation holes in the housing and then retracts. This movement further stimulates the pet's desire to play.

BRIEF DESCRIPTION OF THE DRAWINGS

To better illustrate the technical solutions in the embodiments of the present application, the following is a brief description of the drawings used in the embodiment description. It is evident that the drawings described below are just some embodiments of the application, and those skilled in the art can derive other drawings based on these without inventive effort.

DETAILED DESCRIPTION OF THE EMBODIMENT'S

As people's living standards continue to rise, pet ownership has become a modern trend, and pets require playtime. This has led to a proliferation of pet toys on the market. However, most existing pet toys are exposed and can quickly lose the pet's interest, failing to engage the pet's curious nature effectively and maintain their play interest. For example, some technologies place self-moving toys directly on the ground to attract pets. However, these toys are fully visible to the pet, lacking the effect of occasional hiding and appearing, and thus cannot fully stimulate the pet's playfulness.

To address the technical issues described, the inventors of this application proposed placing a self-moving toy inside a housing and creating openings in the housing. During an operation of the self-moving toy, the self-moving toy can intermittently pass through the openings. Therefore, the self-moving toy presents an effect of appearing and disappearing from view, creating an engaging effect that stimulates the pet's curiosity and playfulness. Additionally, a flexible component is added to the self-moving toy, which swings as the self-moving toy moves. The flexible component can extend and retract through the openings, further enhancing the pet's play interest.

To make the objectives, technical solutions, and advantages of the embodiments of this application clearer, the following description, in conjunction with the accompanying drawings, provides a detailed and complete explanation of the technical solutions in the embodiments of this application. It is evident that the described embodiments are part of the application and not all possible embodiments.

Figure 1:
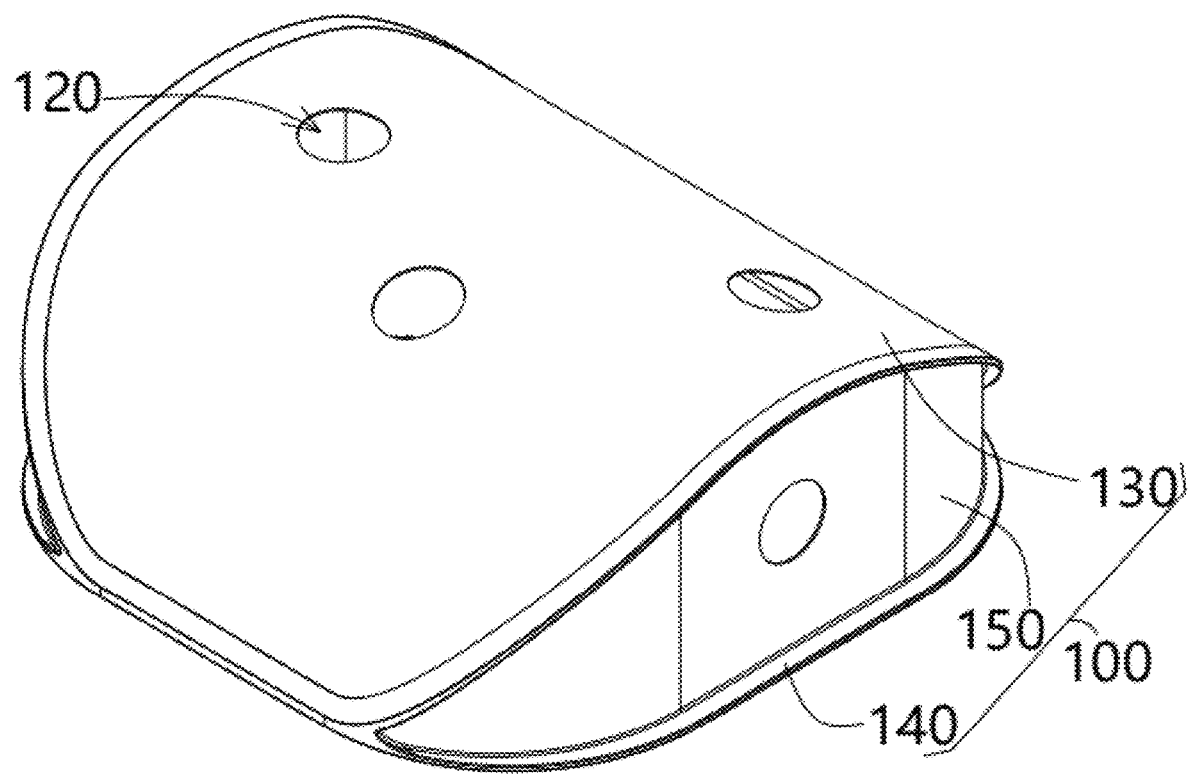
FIG. 1 is a schematic view of a pet toy according to one embodiment of the application.
Figure 2:
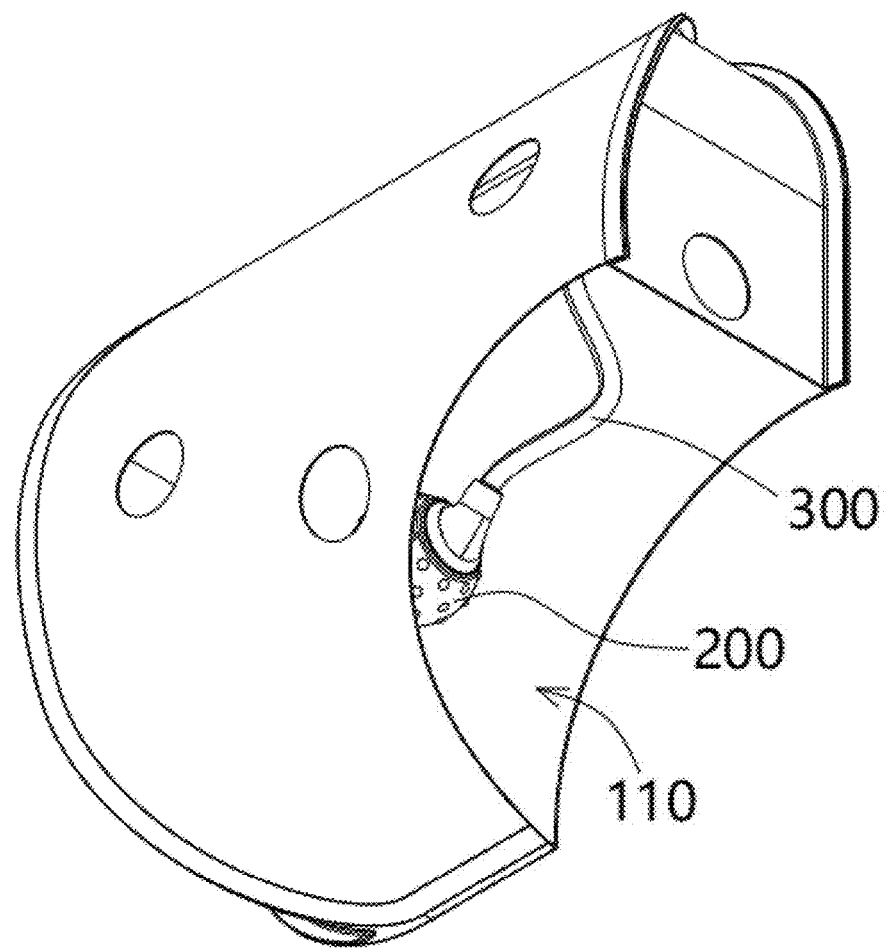
FIG. 2 is a partial cross-sectional view of the pet toy showing part of the structure according to one embodiment of the application.

Refer to FIGS. 1 and 2, in one implementable embodiment, the pet toy includes a housing 100. The housing 100 is designed to form an internal space 110. An outer surface of the housing 100 defines observation holes 120 that communicate with the internal space 110. The observation holes 120 define areas of the internal space 110 that can be seen, so the internal space 110 is divided into visible and hidden areas. In other words, the observation holes 120 do not completely cover the outer surface of the housing 100. From any viewing angle through the observation holes 120, the internal space 110 has both visible and hidden areas. It should be understood that the defined visible and hidden areas change with the viewing angle, rather than being specific regions within the internal space 110.

In this embodiment, the pet toy further includes a self-moving device 200, which is placed inside the internal space 110 of the housing 100. As the self-moving device 200 moves within the internal space 110, it is capable of traveling between the visible and hidden areas. This design allows the self-moving device 200 to occasionally pass through the visible area of the observation holes and at other times enter the hidden area. Consequently, the pet experiences a stimulating effect of the device appearing and disappearing, which effectively engages the pet's playfulness.

Figure 3:
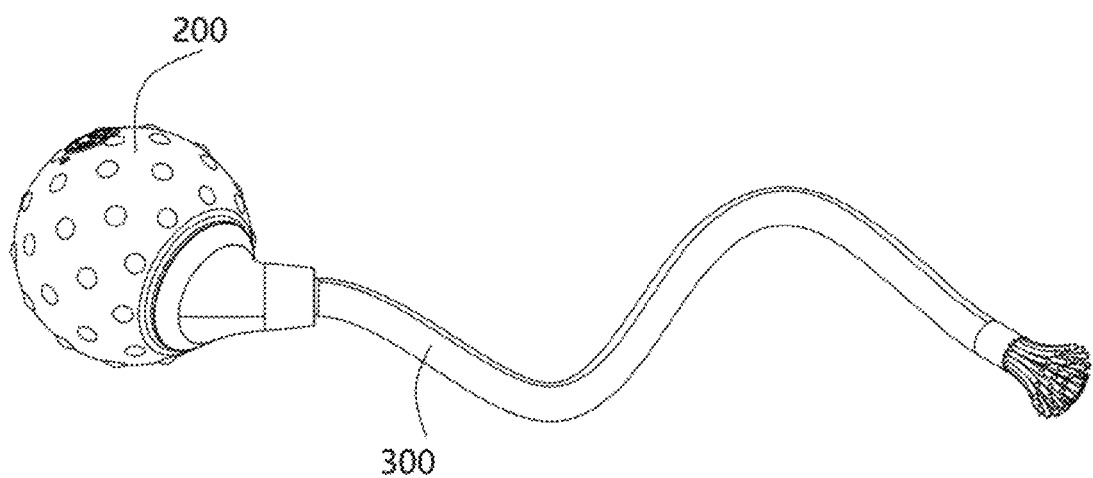
FIG. 3 is a schematic view of a self-moving device assembled with the flexible rope according to one embodiment of the application.

As shown in FIGS. 2 and 3, in one feasible embodiment, the pet toy further includes a flexible rope 300, one end of which is connected to the self-moving device 200. During the movement of the self-moving device 200 within the internal space 110, the self-moving device 200 drives the flexible rope 300 to move, causing the other end of the flexible rope 300 to extend and retract through any one of the observation holes 120. This setup allows the flexible rope 300 to sway in response to the self-moving device 200's movement, creating an effect where the cord intermittently extends from and retracts into the observation holes 120 of the housing 100, further enhancing the pet's play interest.

In practical applications, the flexible rope 300 can be made from various materials such as braided rope, cord, or flexible rubber, which provide a certain degree of flexibility and rigidity.

Regarding the movement of the self-moving device 200, in one feasible embodiment, the self-moving device moves within the internal space 110 by rotating. For example, similar to cat teaser balls known in the prior art, the self-moving device moves by rotating.

In an alternative embodiment, the self-moving device 200 may also move within the internal space 110 by linear motion. For instance, the self-moving device can include walking mechanisms such as wheels or belts, which enable movement within the internal space 110.

As for the specific structure of the housing 100, it includes a top surface 130, a bottom surface 140, and side surfaces 150. These surfaces together form the internal space 110.

Further, as shown in FIG. 1, the side surfaces 150 are two in number; The two side surfaces 150 extend upward from a first end and a second end of the bottom surface 140; The top surface 130 is curved and is connected with a third end and a fourth end of the bottom surface 140. The top surface 130 is connected with sides of the two side surfaces 150 away from the bottom surface 140. This design not only enhances the aesthetic appeal but also allows pets to climb and play on the curved top surface 130, increasing their enjoyment.

Accordingly, the observation holes 120 are respectively provided on the top surface 130 and the two side surfaces 150.

In one feasible embodiment, the housing 100 is made of lightweight material so that when the self-moving device 200 and/or the flexible rope 300 impact at least part of the side surfaces 150 and/or the top surface 130, it causes the housing 100 to shake, further increasing its appeal to pets and enhancing playtime enjoyment.

Figure 4:
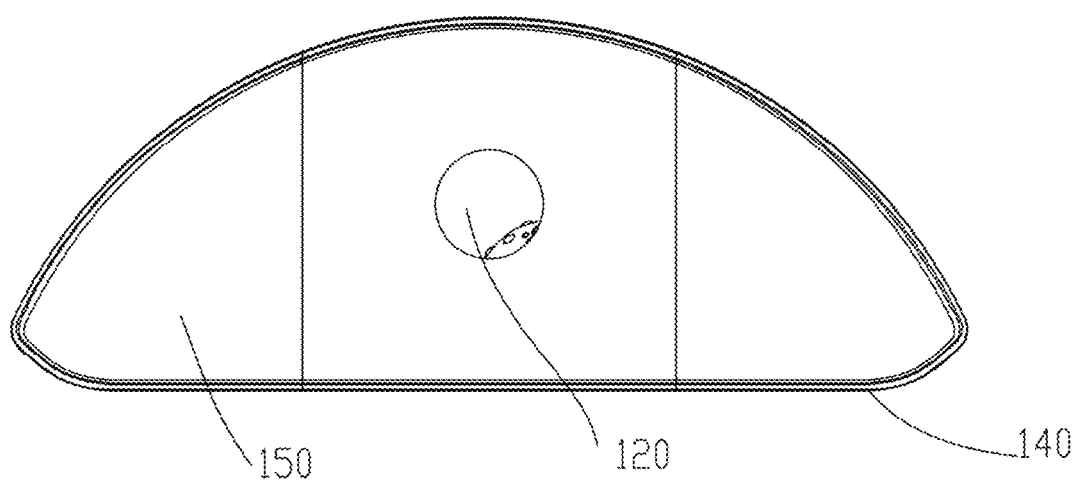
FIG. 4 is a side schematic view of the pet toy according to another embodiment of the application.

In another optional embodiment, as shown in FIG. 4, at least one end of the bottom surface 140 is raised. Therefore, when the self-moving device 200 moves to the raised part, it can press down on this part, causing the entire housing 100 to wobble, achieving multidimensional movement of the pet toy and further increasing the pet's playfulness.

In one feasible embodiment, a diameter of at least one of the observation holes 120 is greater than a size of the self-moving device 200, allowing the self-moving device 200 to be installed into the internal space 110 through the at least one of the observation holes 120. Additionally, the housing 100 may also have other openable access ports that allow the self-moving device 200 to be placed into the internal space 110.

In one feasible embodiment, the housing 100 includes a supporting frame and a flexible cover. The supporting frame is placed inside the flexible cover to form the internal space 110 within the flexible cover, and the observation holes 120 are made in the flexible cover. This design simplifies the manufacturing process of the housing 100 and reduces production costs. In practical applications, the flexible cover may be made of fabric or soft plastic, enhancing the tactile experience for pets during play.

Therefore, the technical solution provided in this application involves placing the self-moving device inside the housing and creating observation holes in the housing. This way, during the self-moving process of the device, it can occasionally pass through the visible area of the observation hole and sometimes enter a hidden area. This creates an effect where the pet sees the self-moving device appear and disappear through the observation hole, effectively stimulating the pet's playfulness.

Additionally, a flexible rope is installed on the self-moving device. The flexible rope can swing with the movement of the self-moving device, creating an effect where it occasionally extends through the observation hole in the housing and sometimes retracts, further enhancing the pet's desire to play.

Moreover, the top surface of the housing is curved, connecting with the opposite ends of the bottom surface and the two side surfaces away from the bottom surface. This design not only enhances the aesthetic appeal but also allows pets to climb and play on the curved top surface, increasing their enjoyment.

The terms "up," "down," and so forth are used to describe the relative positions of various structures in the drawings for clarity in the description and are not intended to limit the scope of implementation. Any changes or adjustments in relative positions, without substantial alterations to the technical content, are also considered within the scope of this application.

It should be noted that, in this application, unless otherwise specified or limited, the term "above" or "below" in relation to a first feature and a second feature can mean that the first and second features are either in direct contact or in indirect contact through an intermediary. Additionally, the terms "above," "on top of," and "above" for a first feature relative to a second feature may indicate that the first feature is directly above or diagonally above the second feature, or simply that the first feature is at a higher horizontal level than the second feature. Conversely, "below," "beneath,"

and "under" may indicate that the first feature is directly below or diagonally below the second feature, or simply that it is at a lower horizontal level.

Furthermore, in this application, unless otherwise specifically defined or limited, terms such as "installed," "connected," "joined," and "fixed" should be understood in a broad sense. For example, they may refer to fixed connections, detachable connections, or integrated structures; they may involve direct connections or indirect connections through intermediaries, or interactions between internal components or between components. A person skilled in the art will understand the specific meaning of these terms in the context of this application according to the specific circumstances.

In the description of this specification, terms such as "one embodiment," "some embodiments," "illustrative embodiments," "examples," "specific examples," or "some examples" refer to the specific features, structures, materials, or characteristics described in that embodiment or example being included in at least one embodiment or example disclosed herein. In this specification, the illustrative use of these terms does not necessarily refer to the same embodiment or example. Furthermore, the specific features, structures, materials, or characteristics described may be combined in various ways in one or more embodiments or examples.

It should be noted that the above embodiments are provided only to illustrate the technical solutions of this application and are not intended to limit them. Although the application has been described in detail with reference to these embodiments, those skilled in the art should understand that modifications to the described technical solutions or equivalent replacements of some or all of the technical features can still fall within the scope of the technical solutions of the embodiments of this application.

The invention claimed is:

1. A pet toy, comprising:
   a housing (100);
   a self-moving device (200); and
   a flexible rope (300);
   wherein the housing (100) defines an internal space (110) therein, observation holes (120) are defined in an outer surface of the housing (100); the observation holes (120) communicate with the internal space (110), and the internal space (110) is observed through the observation holes (120), so the internal space (110) defines a visible areas and a hidden area;
   the self-moving device (200) is placed inside the internal space (110); when the self-moving device (200) moves within the internal space (110), the self-moving device (200) moves back and forth between the visible area and the hidden area;
   a first end of the flexible rope (300) is connected to the self-moving device (200);
   when the self-moving device (200) moves within the internal space (110), the self-moving device (200) drives the flexible rope (300) to move, so that a second end of the flexible rope (300) is allowed to extend out from and retract into any one of the observation holes (120);
   the housing (100) comprises a top surface (130), a bottom surface (140), and two side surfaces (150); wherein the top surface (130), the bottom surface (140), and the two side surfaces (150) of the housing (100) jointly enclose the internal space (110);
   the two side surfaces (150) respectively extend upward from a first end and a second end of the bottom surface (140), the top surface (130) is connected with a third end and a fourth end of the bottom surface (140), the first end of the bottom surface is opposite to the second end of the bottom surface (140), the third end of the bottom surface (140) is opposite to the fourth end of the bottom surface (140), the top surface (130) is curved, and the top surface is connected with the two side surfaces (150);
   the observation holes (120) are respectively defined on the top surface (130) and the two side surfaces (150), and the bottom surface (140) being angled upward at least at one end.

2. The pet toy according to claim 1, wherein the self-moving device (200) moves within the internal space (110) by rotating.

3. The pet toy according to claim 1, wherein the housing (100) is made of a lightweight material, and when the self-moving device (200) and/or the flexible rope (300) hits at least part of the side surfaces (150) and/or the top surface (130), the housing (100) shakes.

4. The pet toy according to claim 1, wherein a diameter of at least one of the observation holes (120) is greater than a size of the self-moving device (200), so that the self-moving device (200) is allowed to be installed into the internal space (110) through the at least one of the observation holes (120).

* * * * *